United States Patent [19]

Jeong

[11] Patent Number: 5,283,648
[45] Date of Patent: Feb. 1, 1994

[54] TELETEXT RECEIVER FOR AUTOMATICALLY CONTROLLING DISPLAYING TIME INTERVAL

[75] Inventor: Tae H. Jeong, Kwangmyoung, Rep. of Korea

[73] Assignee: Samsung Electronics Co., Ltd., Rep. of Korea

[21] Appl. No.: 889,977

[22] Filed: May 29, 1992

[30] Foreign Application Priority Data

May 31, 1991 [KR] Rep. of Korea .................... 9092

[51] Int. Cl.$^5$ ............................................. H04N 7/087
[52] U.S. Cl. ......................................................... 348/468
[58] Field of Search ............. 358/22, 21 R, 147, 142, 358/183, 188; H04N 5/44, 5/445, 5/45, 7/08, 7/087, 9/76

[56] References Cited

U.S. PATENT DOCUMENTS 4,673,983 6/1987 Sarugaku et al. .................. 358/183
5,023,721 6/1991 Moon-Hwan ....................... 358/147
5,177,598 1/1993 Jeong .................................. 358/21 R

FOREIGN PATENT DOCUMENTS 0445715 9/1991 European Pat. Off. .
0218276 8/1989 Japan .
0106281 5/1991 Japan .

*Primary Examiner*—James J. Groody
*Assistant Examiner*—David E. Harvey
*Attorney, Agent, or Firm*—Sughrue, Mion, Zinn, Macpeak & Seas

[57] ABSTRACT

A teletext receiver for automatically controlling a displaying time interval for frames. In the teletext receiver for automatically controlling a displaying time interval for frames, teletext data is stored in a memory by divided fields and displayed per one field for a predetermined time so that the frame can be shifted by a desired time interval in response to an output signal from a microcomputer.

2 Claims, 2 Drawing Sheets

TELETEXT RECEIVER FOR AUTOMATICALLY CONTROLLING DISPLAYING TIME INTERVAL

BACKGROUND OF THE INVENTION

The present invention relates to a teletext receiver for an image terminal in televisions, VCRs or other data banks, and more particularly to a teletext receiver for automatically controlling a displaying time interval between pages in which pages can be shifted at a desired time interval, in accordance with a user's wishes, upon displaying a teletext data on a screen.

In conventional TVs or VCRs, a page of teletext data is displayed after a large number of preceding pages has been displayed, and the page shifting time becomes too large because of the existence of a large amount of data. Further, the larger the shifting time, the longer the displaying time becomes in reading and displaying the teletext data from a teletext broadcasting or a data bank.

SUMMARY OF THE INVENTION

The present invention overcomes these problems and provides a teletext receiver for automatically controlling a displaying time interval between pages in which pages can be shifted at a desired time interval by displaying teletext data by one field for a predetermined time according to an output of a microcomputer (hereinafter termed "MICOM") after storing the teletext data into a memory by divided fields.

A teletext receiver for automatically controlling a displaying time interval between pages according to the present invention comprises a teletext decoder for generating chrominance signals of teletext signals among input broadcasting signals from outside and an encoder for displaying teletext data on a CRT screen by processing the chrominance signals, further including an analog-to-digital converter for converting the teletext data input from the encoder into digital signals, a controller for reading the stored teletext data according to a requirement after sequentially storing the digital signals into the memory, a digital-to-analog converter for displaying the read teletext data in analog signals on the CRT screen.

Other objects and features of the present invention will become more apparent from a consideration of the following description which proceeds with reference to the accompanying drawings in which a preferred embodiment is illustrated by way of example, and not by way of limitation.

DETAILED DESCRIPTION OF THE PREFERRED EMBODIMENTS

The present invention will be described in detail below with reference to the appended drawings.

Figure 1:
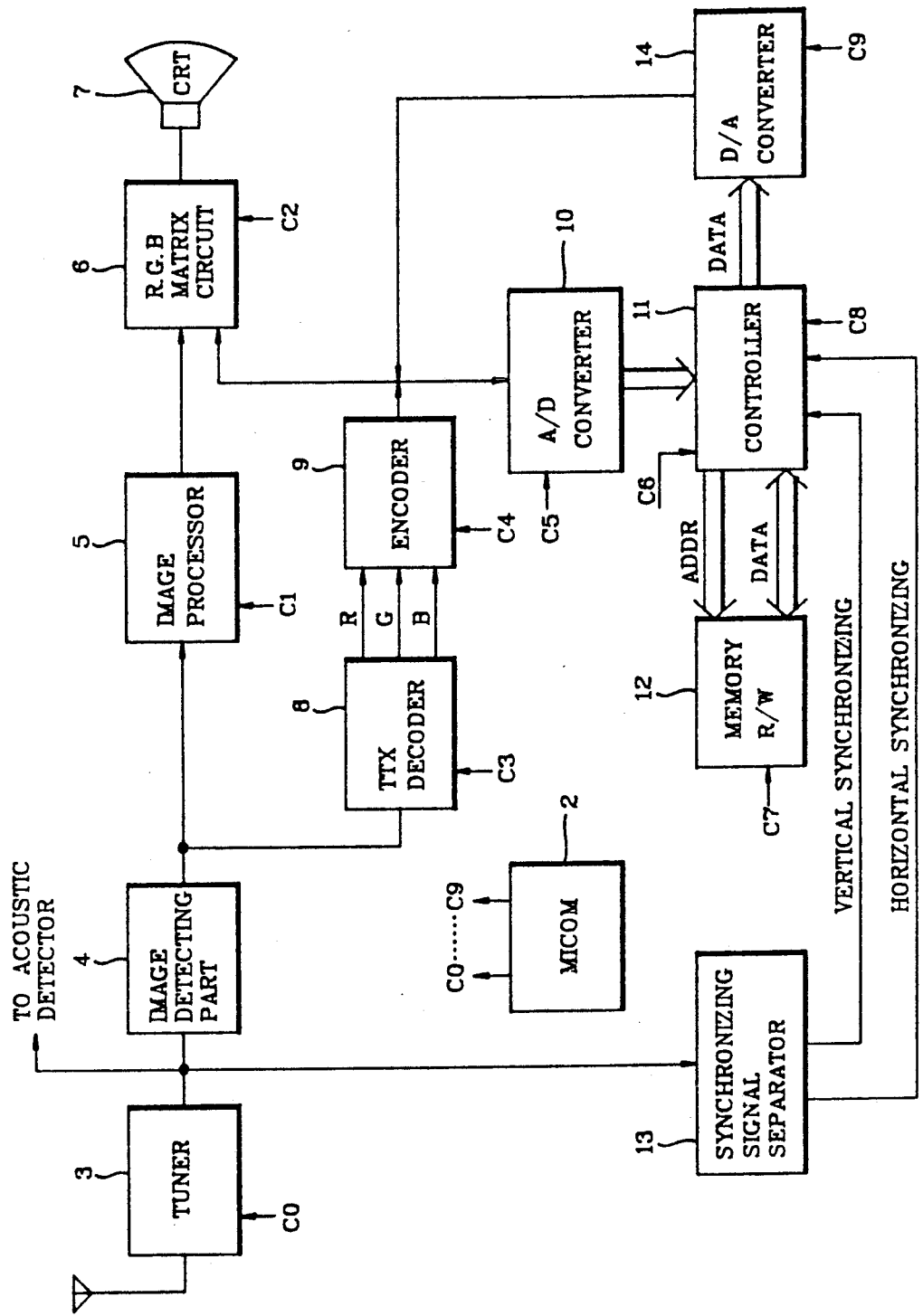
FIG. 1 is a schematic block diagram of an apparatus for controlling the displaying time interval for a teletext receiver according to the present invention.

FIG. 1 is a schematic block diagram of a color TV with the apparatus according to the present invention. Firstly, teletext data of input audio and video signals, received through an antenna 1, is applied to a tuner 3 for selecting the desired channel by control signal CO of a MICOM 2. At this time, desired broadcasting signals selected by the tuner 3 are provided to an image detecting part 4 according to the control of the MICOM 2.

The audio components of the broadcasting signals, from the tuner 3 are applied to an acoustic detector (not shown), processed, and finally output externally.

Composite video signals, in which the teletext data and the video signals are mixed, are output from the image detector 4, and the non-teletext signals (i.e., pure video signals) are applied to an image processor 5.

The image signals are processed in image processor 5 under the control of control signal C1 of a high state generated at the MICOM 2, and then provided to an R.G.B. matrix circuit 6. Then the R.G.B. matrix circuit 6 operates under control of a control signal C2 of a high state from the MICOM 2 to choose image processed video signals and to display the video signals on a CRT screen 7.

If a user turns on a teletext switch to receive teletext data, the MICOM 2 outputs the control signal C1 in a low state, thereby stopping the operation of the image processor 5, and outputs the control signal C2 in a low state. At this time, the R.G.B. matrix circuit 6 is operated to display the teletext data as described below.

Teletext data among the image-detected signals upon the teletext mode is applied to an encoder 9 after being decoded by a teletext decoder 8, which is operated by control signal C3 of the MICOM 2.

The encoder 9 is operated according to control signal C4 and converts the signals applied from the teletext decoder 8 and extracted in a R.G.B. mode to teletext video signals, thereafter supplying the video signals to the R.G.B. matrix circuit 6 to display the teletext data on the CRT screen 7.

On the other hand, in the case of storing the teletext data, the MICOM 2 first provides the control signals C1 and C2 in their low states and the control signals C3 and C4 in their high states so that the teletext data is displayed on the CRT screen 7, and at the same time, provides a control signal C5 in a high state so as to operate an analog-to-digital converter 10. Thus, the analog teletext data is converted to digital data signals, which are applied to a controller 11.

The MICOM 2 operates the controller 11 by a control signal C6, and the digital signals passed through the controller 11 are applied to a memory 12, which is operated by a low state control signal C7 provided from the MICOM 2. The memory 12 stores the data at locations corresponding to address signals ADDR generated at the controller 11 according to each field. An address of each teletext data unit is designated to display multiple pages.

A synchronizing signal separator 13 detects vertical and horizontal synchronizing signals from the composite video signals, and the controller Il is synchronized with the vertical and horizontal synchronizing signals to store the data into the memory 12.

The data which is stored is output as described below. The MICOM 2 generates the control signal C6 and a control pulse signal C8 having a predetermined time interval t and provides these signals to the controller 11 The control signal C6 causes controller 11 to provide the memory 12 with an address signal ADDR. At this time, the control signal C7 is in a high state, so the teletext data which is stored in a corresponding address of the memory 12 is read from the memory and provided to the digital-to-analog converter 14 via the controller 11. The digital-to-analog converter is operated by a control signal C9 to convert the digital data into an analog signal The pulse width t, which controls the display time per page, may be selectively controlled by the user in any known manner. This time t can be under the control of a ring counter within the MICOM 2.

The converted analog signal is applied to the R.G.B. matrix circuit 6, which is under control of the control signal C2 of the MICOM 2.

In the case where the teletext data stored in a memory 12 is to be displayed on the CRT screen 7, the image processor 5, the teletext decoder 8, the encoder 9 and the analog-to-digital converter 10 are made inactive by the control signals C1, C3, C4 and C5, so that only teletext data read from the memory 12 is displayed on the CRT screen 7 via R.G.B. matrix circuit 6.

In the latter case, the time allowed for reading the teletext data, which is sorted on a per page basis, is controlled by the control signal C8. Accordingly, the teletext data pages can be read sequentially one by one under control of the control signal C8. That is, the teletext data pages are displayed one page at a time in sequential manner, with the next page in sequence being displayed whenever one pulse mode is provided by the control signal C8, and returned to the initial page after the final page is displayed. The technique of such page shifting can be realized by a ring counter provided in the controller 11.

Figure 2:
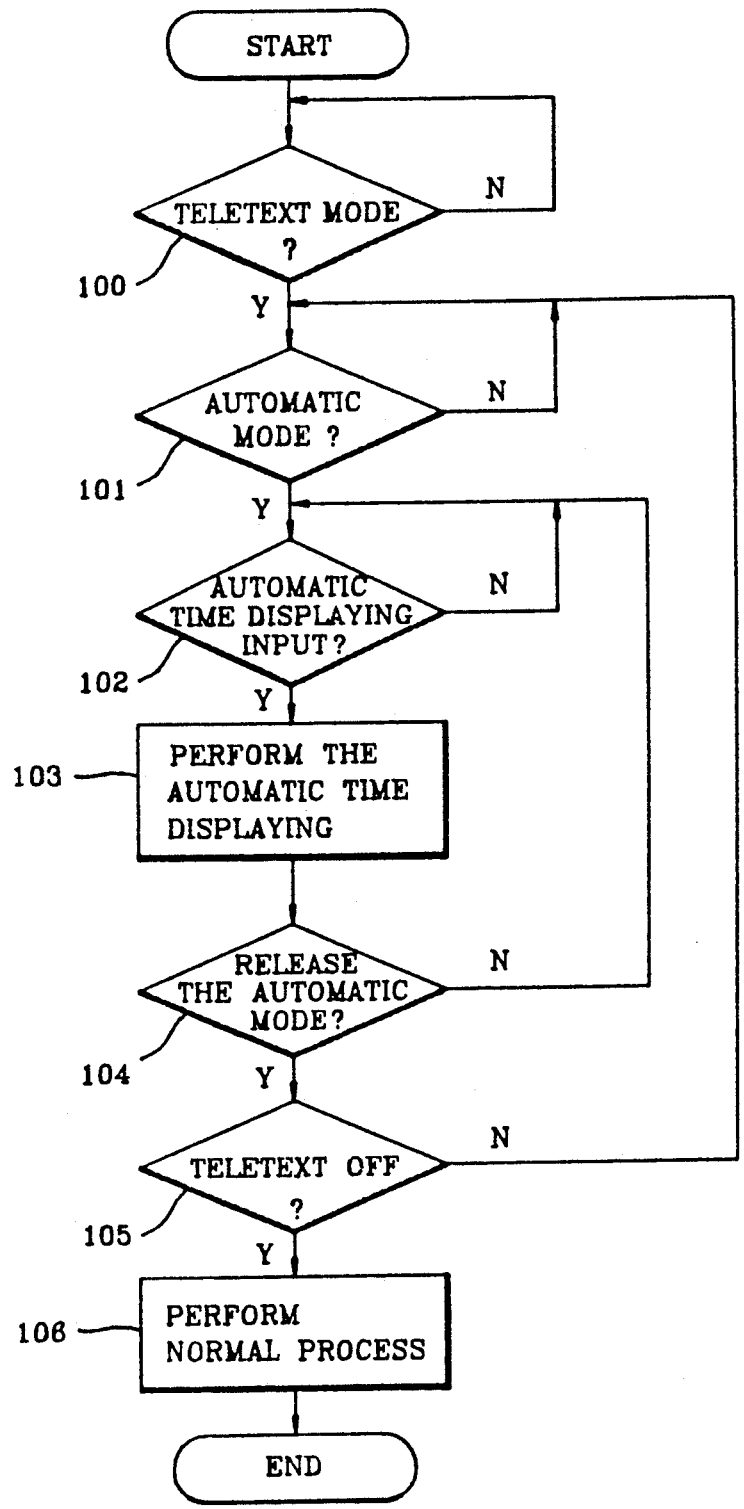
FIG. 2 is a flow chart for operating the apparatus according to the present invention.

FIG. 2 is a control flow chart of the MICOM for performing the function of the apparatus according to the present invention.

The MICOM 2 determines whether the current mode is a teletext mode or not by a step 100, and then proceeds the program from a step 100 to a step 101 if yes. Of course, the generator may determine the current mode by actuating approximately contacts which modify the MICOM of the mode selected The MICOM 2 next determines whether the current mode is a mode for reading the teletext data stored in the memory 12 or not by the step 101, and then, if yes, advances the program from a step 102 to a step 103. The MICOM 2 supplies the control pulse signal C8 to the controller 11 to display the teletext data, which has been stored in a memory 12 until that time, on the CRT screen 7.

In this case, the pulse signals with a predetermined period t are generated sequentially, thereby displaying the teletext data on the CRT screen 7 by a period time t.

If the user releases the automatic mode (step 104), the MICOM 2 determines whether the teletext mode should be released or not, and if yes, advances to perform a general mode (steps 105 and 106).

As described above, according to the present invention, the displaying time interval per page can be randomly set via a ring counter, and teletext pages can be automatically shifted at a desired time interval. Accordingly, the displaying time per page can be controlled as the user wishes in automatically displaying the teletext pages from a teletext broadcasting or a data bank.

The present invention is not limited to the embodiment described hereinabove. Various modifications of disclosed embodiment of the present invention will become apparent to persons skilled in the art upon reference to the description of the present invention. Therefore, the appended claims will cover any such modifications or embodiments as they fall within the true scope of the present invention.

What is claimed is:

1. A teletext receiver comprising:
means for automatically controlling the displaying time interval per frame of teletext data, said means comprising:
a teletext decoder for generating chrominance signals of teletext signals from a received broadcasting signal;
an encoder for displaying teletext video signals on a CRT screen by processing said chrominance signals;
an analog-to-digital converter for converting input teletext data from said encoder into digital signals;
a memory;
a controller for sequentially storing said digital signals in said memory and for controlling the read out of said teletext data from said memory;
a digital-to-analog converter for converting teletext data read out of said memory into an analog signal for display on said CRT screen; and
a microcomputer for controlling said teletext decoder, said encoder, said analog-to-digital converter, said memory and said controller so that a user can control a display time of teletext data on a per page basis.

2. The teletext receiver according to claim 1, wherein said controller comprises means for controlling the duration of the per frame display of teletext data read out from said memory in accordance with a received pulse signal of selected duration.

* * * * *